United States Patent [19]
Johnson et al.

[11] Patent Number: 5,250,267
[45] Date of Patent: Oct. 5, 1993

[54] PARTICULATE COLLECTION DEVICE WITH INTEGRAL WET SCRUBBER

[75] Inventors: Dennis W. Johnson, Barberton; Robert B. Myers; Donald P. Tonn, both of Copley Township, Summit County, all of Ohio

[73] Assignee: The Babcock & Wilcox Company, New Orleans, La.

[21] Appl. No.: 903,312

[22] Filed: Jun. 24, 1992

[51] Int. Cl.$^5$ .................. B01D 50/00; B01D 51/00; B03C 3/00
[52] U.S. Cl. .................. 422/168; 422/169; 422/172; 422/176; 55/341.1; 55/343; 55/344; 55/418; 137/605; 137/892; 96/55; 96/73
[58] Field of Search ............ 422/168, 169, 170, 172, 422/176; 55/7, 124, 128, 133, 220, 233, 341.1, 343, 344, 418; 137/893, 892, 605, 606, 861, 872

[56] References Cited

U.S. PATENT DOCUMENTS

| | | | |
|---|---|---|---|
| 3,631,655 | 1/1972 | Mullen | 55/133 |
| 3,633,337 | 1/1972 | Walker et al. | 55/220 |
| 3,672,502 | 6/1972 | Janich | 55/343 |
| 3,894,853 | 1/1975 | Pike | 55/258 |
| 3,986,848 | 10/1976 | Howell | 55/7 |
| 4,141,698 | 2/1979 | Kihlstedt et al. | 55/6 |
| 4,193,774 | 3/1980 | Pilat | 55/10 |
| 4,194,889 | 3/1980 | Wanner | 55/7 |
| 4,472,182 | 9/1984 | Zimmermann et al. | 55/319 |

Primary Examiner—Robert J. Warden
Assistant Examiner—Christopher Y. Kim
Attorney, Agent, or Firm—Robert J. Edwards; Michael L. Hoelter

[57] ABSTRACT

An integrated jet scrubber and particulate collection device for removing sulfur oxides and other contaminants from combustion flue gas and also for removing particulates from this gas, such operations occurring in a single, integrated unit or assembly. In some instances, this combination device may be located in the lower portion of a chimney or stack.

7 Claims, 2 Drawing Sheets

PARTICULATE COLLECTION DEVICE WITH INTEGRAL WET SCRUBBER

FIELD OF THE INVENTION

This invention pertains to the removal of particulates, sulfur oxides, and/or other contaminants from combustion flue gases and more particularly to the integration of a wet flue gas desulfurization device with a particulate collection device.

BACKGROUND OF THE INVENTION

As is well known, particulates such as fly ash, sulfur oxides, and/or other contaminants must be removed from combustion exhaust gases in order to comply with federal, state and possibly local emission requirements. These gases usually result from the combustion of coal or other fossil fuel and they often are emitted from power generating facilities, waste-to-energy plants, incinerators, and/or other industrial processes.

Known methods of accomplishing sulfur and other contaminant removal include utilizing fossil fuels having a low content of such contaminants. Lacking such a supply of fuel or in addition to the use of such fuel, sulfur and/or contaminant content can also be reduced prior to combustion via mechanical or chemical processes. One major disadvantage of such mechanical or chemical processing is the cost required to achieve the desired level of sulfur or contaminant removal.

A method of removal occurring after combustion involves mixing dry alkali material either with the fuel prior to combustion or injecting such material directly into the hot combustion gases after combustion has occurred. This will enable the then available alkali to remove sulfur oxides and other contaminants via absorption or adsorption followed by oxidation. Unfortunately, this method fouls the heat transfer surfaces which necessitates more frequent soot blowing. Other disadvantages include low to moderate removal efficiencies, poor reagent utilization, and increased particulate loadings in the combustion gases. This last disadvantage may also require further conditioning (i.e. humidification or sulfur trioxide injection) of the combustion gas if an electrostatic precipitator is used for downstream particulate collection.

Alternately, a method known as wet chemical absorption (i.e. wet scrubbing) may be used. In accordance with this method, the hot combustion gases are typically washed in an up flow gas liquid contact device with an aqueous alkaline solution or slurry. Such solution or slurry chemically alters and removes the sulfur oxides and other contaminants from the flue gases. The disadvantages of this method include the loss of liquid both to the atmosphere (i.e. due to saturation of the flue gas and mist carry-over) and the sludge produced during this process. Additional disadvantages pertain to the cost associated with the material needed for the construction of the absorber module and all related downstream auxiliary equipment (i.e. primary/secondary dewatering and waste water treatment subsystems).

The method known as "dry scrubbing" (i.e. spray drying chemical absorption process) may also be utilized to remove sulfur oxides and other contaminants from the flue gases. In accordance with dry scrubbing, an aqueous alkaline solution or slurry is finely atomized (via mechanical, dual fluid, or rotary cup type atomizers) and sprayed into the hot flue gas. This contact chemically alters the sulfur oxides and other contaminants in the flue gas thereby leading to their removal. The major disadvantages to dry scrubbing being a moderate to high pressure drop across the spray dryer gas inlet distribution device and the limitation on temperature drop allowed in order to maintain controlled operations.

While the above methods pertain primarily to sulfur oxide and other contaminant removal, they do not necessarily address the removal of particulates such as fly ash and the like. To remove these particulates, a baghouse or an electrostatic precipitator (ESP) is often utilized.

A baghouse typically incorporates one or more fabric filters that trap particulate matter (dust) by direct impingement on the filter cloth. This method may be used as a means of dry particulate collection where the temperature and humidity of the gases to be handled are within an acceptable range. Typical types of baghouses include pulse-jet and reverse air types and such baghouses may often be positioned around the chimney through which the exhaust gases exit the facility.

Electrostatic precipitators utilize an electric charge that is applied to the particulate matter (dust) to be collected. This charge subsequently propels the particles, by electrostatic force, to the collecting curtain where they are removed from the flue gas. Such a method may be used provided the temperature and humidity of the flue gases are within an acceptable range. Typical types of electrostatic precipitators include rigid electrode, rigid frame and weighted wire types.

It is an object of this invention to provide a means of removing particulates in addition to sulfur oxides and other contaminants from exhaust flue gases in an efficient and economical manner. A main object of this invention is to combine a wet scrubber and a particulate collection device into a single integrated unit. Another object of this invention is to eliminate the need and thus the cost of ductwork normally required to transfer the flue gases between these two devices. Still another object of this invention is to configure a baghouse or other type of particulate collection device around a vertical up-flow counter-current wet scrubber. Yet another object of this invention is to save space at the facility by combining these two operations into a single piece of equipment. While the prior art discusses flue gas desulfurization systems in series with particulate collection devices, an object of this invention is to combine these components so that they become integral parts of the same vessel, device, or apparatus. Still another object of this invention is to incorporate these two devices together and install it in the unused space at the base of the chimney. These and other objects and advantages of this invention will become obvious upon further investigation.

SUMMARY OF THE INVENTION

This invention pertains to a wet scrubber/particulate collection device that combines both operations together into a single unit or assembly. The wet scrubber component consists of an upper flue gas exit, an internal chamber, and a midlevel flue gas inlet. The particulate collection component, located upstream of the wet scrubber, can be isolated via one or more isolation dampers that are located between these components. To control the flow of flue gas through the particulate collection component, control means such as dampers are activated.

DETAILED DESCRIPTION OF THE DRAWINGS

Figure 1B:
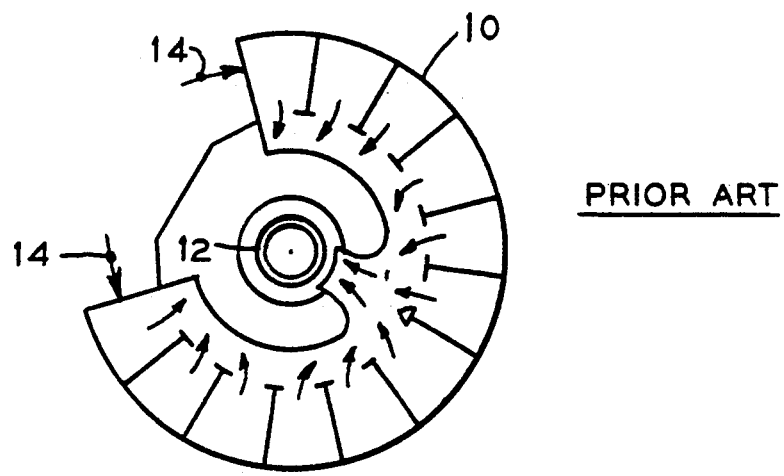
FIGS. 1a and 1b are schematic illustrations of a prior baghouse arrangement surrounding a chimney or stack.
Figure 1A:
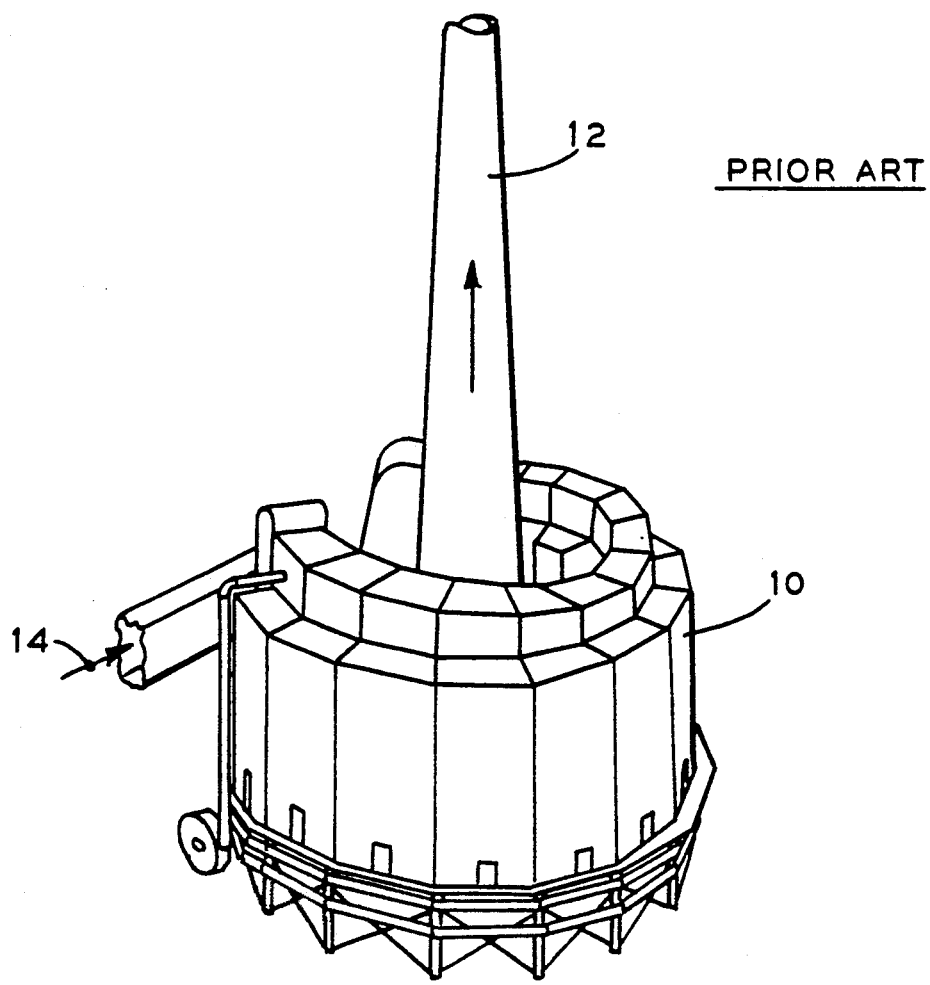

Referring initially to FIGS. 1a and 1b, there is shown a sketch illustrating a prior arrangement of a baghouse 10 around the base of chimney or stack 12. In this arrangement, flue gas 14 first enters baghouse 10 where any particulate material contained therein would be removed before proceeding on to stack 12. If any sulfur oxides or other contaminants are also to be removed from flue gas 14, they are removed at some other location before or after such flue gas enters baghouse 10.

Figure 2:
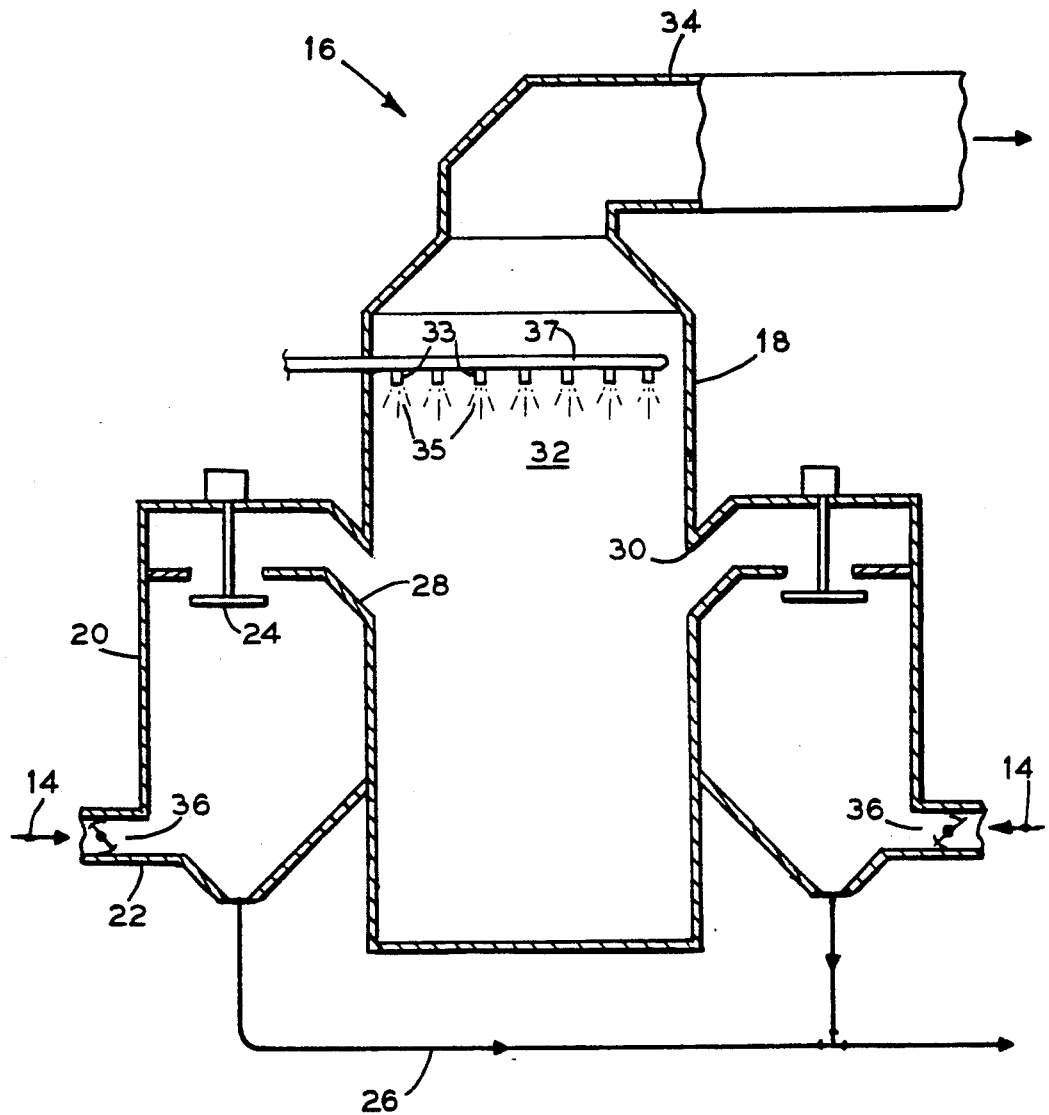
FIG. 2 is a schematic diagram, partially cut away for clarity, of the invention.

In accordance with this invention, and as shown in FIG. 2, there is illustrated assembly 16 which consists of wet scrubber 18 integrated with particulate collection device 20. FIG. 2 illustrates a typical assembly that utilizes a baghouse as the particulate collection device. Because these two previously separate operations are now combined into the same piece of equipment, wet scrubbing and gas-solids separation of flue gas 14 can occur in less space.

As illustrated, particulate collection device 20, such as a baghouse or an electrostatic precipitator (not shown), is positioned around wet scrubber 18. It is preferable for device 20 to be concentrically located around scrubber 18 but it may also be positioned otherwise, space permitting. Furthermore, scrubber 18 would generally be a vertical up-flow counter-current gas/liquid contact type wet scrubber, but other types or orientations of scrubber 18 are equally likely in accordance with this invention. Assembly 16 is intended to both remove sulfur oxides and other contaminants as well as particulates that are normally contained in flue gas 14 formed during the combustion of fossil fuels and/or waste materials.

Generally, hot flue gas 14 enters inlet flue 22 of particulate collection device 20 through isolation dampers 36. This flue gas 14 then passes from the bottom upward through the various individual compartments of device 20 in the typical manner. In this fashion, flue gas 14 passes through the fabric filter bags (if a baghouse) or the charging apparatus (if an electrostatic precipitator) (neither of which are shown) whereupon any air-born particulates are deposited upon the entrance side of such filters. Afterwards, cleaned flue gas 14 exits the top of device 20 through isolation dampers 24 while the collected particulates are removed from the bottom via line 26. The flow of flue gas 14 through device 20 is controlled by dampers 24 and/or 36 which are also capable of isolating the individual compartments of device 20 in order to facilitate their cleaning and/or maintenance. Alternatively, and as preferred for a precipitator type particulate collection device 20, flue gas 14 passes through a series of compartments or fields concentrically located around wet scrubber 18. Dampers 24 and/or 36 are optional depending upon the type of particulate collection device 20 selected.

Upon passing through isolation dampers 24, flue gas 14 is directed downward through sloped section or fluework 28 to midlevel inlet 30 of wet scrubber 18. Inlets 30 are located around the perimeter of wet scrubber 18 to radially and more evenly distribute the flue gas to chamber 32 of wet scrubber 18. Such radial supply of flue gas 14 to a midlevel region of chamber 32 results in improved gas flow distribution across wet scrubber 18 because the flue gas enters chamber 32 from a variety of locations rather than just one location as is typical.

Immediately upon entering chamber 32 of wet scrubber 18, the flue gas 14 expands and turns upwards into the countercurrent absorption zone of chamber 32. It is within this countercurrent absorption zone that the flue gas 14 is initially cooled and saturated. As the gas continues to rise upwards through this zone, completion of sulfur oxide/other contaminant removal occurs. After the gas leaves this zone, it continues to rise upward passing through mist eliminators (not shown) prior to exiting chamber 32.

The spraying occurring within wet scrubber 18 is typically accomplished via mechanical nozzles 33. Wet scrubbers may also utilize a gas flow distribution device internally. Such a gas flow distribution device facilitates the mixing of flue gas 14 with sprayed droplets of an alkaline solution or slurry 35 in chamber 32.

The alkali solution 35 sprayed within chamber 32 is atomized by either a single or a multiple array of atomizers or nozzles 33. These arrays distribute a homogeneous spray of an alkali solution or slurry 35 reagent into the hot flue gas 14 to absorb any sulfur oxides and/or other contaminants generally with a large excess of water. Some evaporation of the moisture in the slurry 35 will occur within chamber 32. While entrained moisture is removed, in the typical fashion, via mist eliminators. As a result of the spraying of the solution 35 upon flue gas 14, the temperature of such gas will drop dramatically. This now cooled flue gas will thus exit chamber 32 vie outlet plenum 34.

As can be imagined, the pressure loss or drop between the exit of device 20 and the entrance of chamber 32 is minimal due to the elimination of any significant length of interconnecting fluework/transition sections 28 between the two. Normally, long lengths of such sections are used to interconnect the prior art wet scrubber operation with the particulate collection operation thereby typically resulting in an undesirably large pressure loss.

While it is not shown here, assembly 16 can be incorporated into the lower unused portion or base of chimney or stack 12. Consequently, the exiting and now cleaned flue gas 14 will flow directly to the chimney liner. If assembly 16 is installed exterior to chimney or stack 12, the cleaned flue gas 14 leaving assembly 16 passes through plenum 34 directly to the discharge flue work.

Some of the advantages of integrating wet scrubber 18 with particulate collection device 20 is the fact that assembly 16 is now suited for retrofit on waste-to-energy plants, incinerators, or such facilities and for fossil fuel fired combustors. This is because wet scrubber/fabric filter technology is favored for limiting emissions of acid gases ($SO_2$, $HCl$, $HF$, $H_2SO_4$, etc.), heavy metals (arsenic, cadmium, chromium, lead, mercury, etc.) and organic chemicals (dioxin, furans, etc.). Additionally, and due to the simplicity of design, assembly 16 is suitable for installation in the lower unused portion of chimney or stack 12. Furthermore, assembly 16 occupies a smaller foot print than the current state of the art wet scrubber/baghouse or wet scrubber/electrostatic precipitator combinations, thus requiring less free space for installation. Other advantages pertain to a lower initial capital cost due to the elimination of interconnecting/transition flue work required to connect the particulate collection device's outlet with the wet scrubber's inlet flue or distribution plenum 22. Also, the overall general reduction in the various materials of construction, including foundations, insulation/lagging, building enclosure, ash handling piping, etc., should be considered. Another advantage is a low or negligible pressure drop occurring across the transition from the particulate collection operation to the wet scrubber operation. Additionally, the radial entry of flue gas 14 into chamber 32 results in improved gas flow distribution when compared against prior art single side entry wet scrubbers. Such improved gas flow distribution within wet scrubber 18 further enhances the mass transfer of sulfur oxides/other contaminants from the gas phase to the liquid phase via absorption, thus improving removal efficiencies.

Alternate embodiments of this invention include, in lieu of a baghouse or an electrostatic precipitator, the employment of other means for gas-solids separation and particulate collection.

What is claimed is:

1. A wet scrubber/particulate collection device comprising:
   a) a wet scrubber component having a flue gas exit, an internal chamber, and radial midlevel inlets to said chamber;
   b) a particulate collection component positional around said wet scrubber and secured around said midlevel inlets of said wet scrubber, said particulate collection component being divided into compartments, each said compartment having a flue gas entrance and at least one isolation dampers located between said wet scrubber component and said particulate collection component, said wet scrubber component and said particulate collection component together comprising a single assembly; and,
   c) control means secured to said flue gas entrance for controlling the flow of flue gas through said particulate collection component of said assembly.

2. The apparatus as set forth in claim 1 wherein said wet scrubber component is a vertical up-flow counter current gas/liquid contact wet scrubber.

3. The apparatus as set forth in claim 2 wherein said control means comprise control dampers to control the flow of combustion flue gas through said particulate collection component.

4. The apparatus as set forth in claim 3 wherein said particulate collection component is concentrically positioned around said wet scrubber component.

5. The apparatus as set forth in claim 3 wherein said wet scrubber/particulate collection device is constructed and arranged so as to fit inside the lower portion of a chimney or stack.

6. The apparatus as set forth in claim 3 wherein said particulate collection component is a baghouse.

7. The apparatus as set forth in claim 3 wherein said particulate collection component is an electrostatic precipitator.

* * * * *